United States Patent
Smith et al.

(10) Patent No.: US 8,239,287 B1
(45) Date of Patent: Aug. 7, 2012

(54) SYSTEM FOR DETECTING PROBABILISTIC ASSOCIATIONS BETWEEN ITEMS

(75) Inventors: Brent R. Smith, Redmond, WA (US); Ronald Whitman, Seattle, WA (US); Gaurav Chanda, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 607 days.

(21) Appl. No.: 12/354,233

(22) Filed: Jan. 15, 2009

Related U.S. Application Data (60) Provisional application No. 61/110,498, filed on Oct. 31, 2008.

(51) Int. Cl.
*G06Q 30/00* (2012.01)
(52) U.S. Cl. .............. 705/26.7; 705/26.1; 705/27.1
(58) Field of Classification Search .......... 705/26.27, 705/26.1, 26.7, 27.1
See application file for complete search history.

(56) References Cited

U.S. PATENT DOCUMENTS

| | | | |
|---|---|---|---|
| 5,749,081 | A | 5/1998 | Whiteis |
| 6,321,221 | B1 | 11/2001 | Bieganski |
| 6,691,163 | B1 | 2/2004 | Tufts |
| 6,912,505 | B2 * | 6/2005 | Linden et al. .............. 705/14.53 |
| 7,542,951 | B1 | 6/2009 | Chakrabarti et al. |
| 7,636,677 | B1 * | 12/2009 | McGonigal et al. ......... 705/26.7 |
| 7,792,706 | B2 * | 9/2010 | Tirumalareddy et al. .... 705/26.8 |
| 2002/0019763 | A1 | 2/2002 | Linden et al. |
| 2002/0184139 | A1 | 12/2002 | Chickering et al. |
| 2002/0198882 | A1 * | 12/2002 | Linden et al. ................... 707/10 |
| 2003/0101451 | A1 | 5/2003 | Bentolila et al. |
| 2003/0105682 | A1 | 6/2003 | Dicker et al. |
| 2004/0172267 | A1 | 9/2004 | Patel et al. |
| 2004/0267604 | A1 * | 12/2004 | Gross ............................. 705/10 |
| 2005/0038717 | A1 | 2/2005 | McQueen, III et al. |
| 2005/0091245 | A1 | 4/2005 | Chickering et al. |
| 2006/0184357 | A1 | 8/2006 | Ramsey et al. |
| 2007/0198337 | A1 | 8/2007 | Coon |
| 2008/0086444 | A1 | 4/2008 | Yu et al. |
| 2008/0294617 | A1 * | 11/2008 | Chakrabarti et al. ............. 707/5 |

FOREIGN PATENT DOCUMENTS

WO 9941694 A1 8/1999

(Continued)

OTHER PUBLICATIONS

Hayes, Brian, "Randomness as a Resource," American Scientist, vol. 89, No. 4 Jul.-Aug. 2001, (available at www.americanscientist.org/issues/pub/randomness-as-a-resource/3 (accessed Jul. 9, 2009).*

(Continued)

*Primary Examiner* — Jeffrey A Smith
*Assistant Examiner* — Anne Georgalas
(74) *Attorney, Agent, or Firm* — Knobbe Martens Olson & Bear LLP (57) ABSTRACT

A computer system for detecting associations between items may include a probabilistic analysis component that accesses user data having information about item selections by a plurality of users. The probabilistic analysis component may programmatically generate associations between certain items by determining a first number of users who selected the items and by estimating a probability that a second number of users would have selected the items due to random chance. The probabilistic analysis component may estimate this probability based at least partly on a number of item selections made by one or more of the users.

22 Claims, 3 Drawing Sheets

FOREIGN PATENT DOCUMENTS

WO     WO 99/41694 A1     8/1999

OTHER PUBLICATIONS

Conditional Probability, http://stat.yale.edu/Courses/1997-98/101/condprob.htm dated Sep. 14, 2001 [retrieved from Internet Archive on Jan. 11, 2010].*

"Amazon.com Recommendations: Item-to-Item Collaborative Filtering," by Greg Linden, Brent Smith, and Jeremy York, IEEE Internet Computing, Jan./Feb. 2003, pp. 76-80.*

U.S. Appl. No. 10/286,430, filed Oct. 30, 2002 (application, text, drawings, and filing receipt provided).

U.S. Appl. No. 10/393,505, filed Mar. 19, 2003 (application, text, drawings, and filing receipt provided).

U.S. Appl. No. 10/286,430, filed Oct. 30, 2002 (application text, drawings, and filing receipt provided).

U.S. Appl. No. 10/393,505, filed Mar. 19, 2003 (application text, drawings, and filing receipt provided).

* cited by examiner

FIG. 3

SYSTEM FOR DETECTING PROBABILISTIC ASSOCIATIONS BETWEEN ITEMS

RELATED APPLICATION

This application claims the benefit of priority under 35 U.S.C. §119(e) of U.S. Provisional Patent Application No. 61/110,498, filed on Oct. 31, 2008, and entitled "System for Detecting Probabilistic Associations Between Items," the disclosure of which is hereby incorporated by reference in its entirety.

BACKGROUND

A variety of methods are known for detecting behavior-based associations (associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). See, e.g., U.S. Pat. No. 6,912,505. As another example, the web browsing histories of users can be analyzed to identify behavior-based associations between particular web sites and/or web pages. See, e.g., U.S. Pat. No. 6,691,163 and U.S. Pat. Pub. 2002/0198882.

The detected behavior-based associations are typically used to assist users in locating items of interest. For example, in the context of an electronic catalog, when a user accesses a network resource, such as a web page, that is associated with an item, the resource may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, and/or other item selections.

BRIEF DESCRIPTION OF THE DRAWINGS

Specific embodiments will now be described with reference to the drawings, which are intended to illustrate and not limit the various features of the inventions. In the drawings, similar elements have similar reference numerals.

DETAILED DESCRIPTION OF SPECIFIC EMBODIMENTS

Several different computer-implemented processes will now be described for detecting associations between items, for example, to improve item recommendations provided to users. These processes may, for example, be embodied individually or in any combination in a multi-user computer system ("system") that implements a recommendation system. Certain embodiments of these systems and processes detect associations among items using probabilistic models that take into account a number of items (or approximate number of items) that a user or users have purchased.

For purposes of illustration, the processes are described primarily in the context of a system that detects associations among catalog items for the purpose of recommending such items to users of an e-commerce web site. As will be apparent, however, the disclosed processes can also be used in other types of systems, and can be used to recommend other types of items, such as but not limited to web sites, news articles, blogs, podcasts, travel destinations, service providers, other users, events, discussion boards, photos and other images, online videos, tagged items, and user-generated lists of items. In addition, the disclosed processes need not be implemented as part of, or in conjunction with, a web site.

As used herein, the term "item" is used interchangeably to refer to an item itself (e.g., a particular product) and to its description or representation in a computer system. As will be apparent from the context in which it is used, the term is also sometimes used herein to refer only to the item itself or only to its representation in the computer system.

Figure 1:
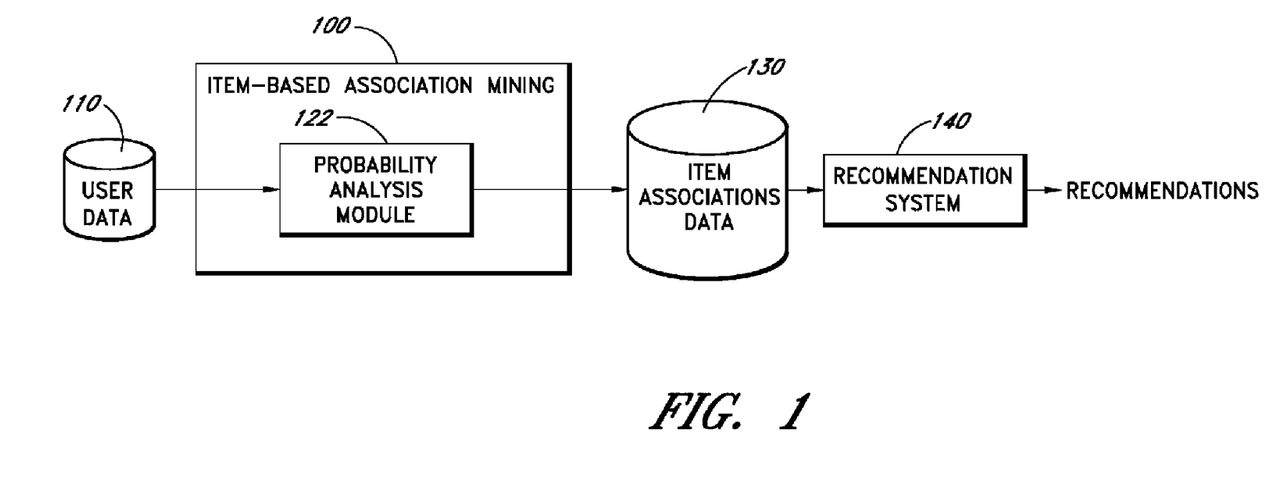
FIG. 1 illustrates an embodiment of an association mining system.

Turning to FIG. 1, an embodiment of an item-based association mining system 100 is shown. The association mining system 100 obtains data regarding items from a user data repository 110. The association mining system 100 analyzes this data to determine which items should be associated together. Details about associated items are passed from the association mining system 100 to an item association data repository 130. A recommendation system 140 uses the association data stored in the repository 130 to recommend items to a target user.

The data repository 110 includes one or more physical computer storage devices for storing user and/or item data. User data may include (in the example context of e-commerce) users' purchase histories, item viewing histories, item download histories, item rental histories, item ratings, and item tags, among other possible activity data. Item data (in the example context of e-commerce) can include books, movies, music, television shows, apparel, electronic books ("e-books"), electronics, academic papers, software for download, and the like. Thus, the item data may include data that represents real, physical items.

The association mining system 100 includes a probabilistic analysis component 122 that analyzes the user data in the repository 110 to determine which items could be associated with other items based on, for example, user behavior. In certain embodiments, the probabilistic analysis component 122 analyzes item selections by users to determine, for example, the likelihood that a person who selected item A would have also selected item B. Item selections can include user actions such as purchases, views, downloads, rentals, clicks, combinations of the same, and the like. For example, the probabilistic analysis component 122 can estimate the likelihood that a person who bought item A would have also bought item B. For ease of illustration, the remainder of this disclosure discusses association mining in the context of purchases. However, association mining may be conducted using other types of item selections.

If the probabilistic analysis component 122 determines that a user who bought A would have also likely bought B, then the probabilistic analysis component 122 can generate an association or similarity between these two items. The probabilistic analysis component 122 may also generate a score that indicates a degree of association between the items. In certain embodiments, the probabilistic analysis component 122 therefore transforms user and/or item data into associations having association scores, which may represent detected relationships between real, physical items.

In certain embodiments, the probabilistic analysis component 122 generates associations by determining a number of users who actually bought both items A and B and also by estimating how many users might have bought both items A and B due to random chance. The more users who actually bought both items A and B, the higher the degree of association could be between those items. Conversely, the more users who were estimated to buy both A and B due to random chance, the lower the degree of association could be between those items. Advantageously, in certain embodiments, the probabilistic analysis component 122 estimates the random overlap between A and B by taking into account the number of purchases of some or all users who also bought item A. More detailed example techniques that may be used by the probabilistic analysis component 122 are described below.

The probabilistic analysis component 122 stores the association, along with its score, as a mapping between items in a table or other data structure of an associations data repository 130. Thereafter, a recommendation system 140 can retrieve the associations between items from the associations data repository 130. Using the associations, together with user data about a specific user, the recommendation system 140 can generate personalized item recommendations for that user. Example techniques for generating personalized item recommendations using associations or similarities are described in U.S. Publication No. 2002/0198882, referred to above. The recommendations system 140 may also output the recommendations for presentation (e.g., display) to the user. Thus, in certain embodiments, the recommendation system 140 transforms the associations and/or user data into recommendations that further represent physical items.

To describe how the probability analysis module 122 analyzes items, a brief overview of two initial example probabilistic models will now be described.

First Model

In a first model, for instance, the degree to which A is associated with, or is similar with, B could be represented as follows:

$$P(B|A)-P(B) \quad (1)$$

where P(B|A) represents the observed probability that a user purchased B given that the user also purchased A, and P(B) represents (in one embodiment) the estimated probability that a user purchased just B. The expression (1) may produce a value that can be used as a score to represent the degree of similarity or association between items A and B. This score might also be further manipulated to obtain a final similarity or association score by, for example, combining values calculated according to expression (1) for purchases, views, and other selection events.

P(B|A) could be further represented as follows:

$$P(B|A) = \frac{|A \cap B|}{|A|} \quad (2)$$

where |A| represents a number of people who bought A, and |B| represents a number of people who bought B. Equation (2) illustrates that P(B|A) can be determined by finding the observed number of people who bought both (e.g., the intersection of A and B) divided by the number of people who bought A. P(B) could be represented as follows:

$$P(B) = \frac{\# \text{ of people who bought } B}{\text{total } \# \text{ of customers}} \quad (3)$$

Thus, the higher the number of people who bought B, the lesser the value resulting from expression (1), or the lower the degree of similarity between A and B, and vice versa. Similarly, the higher the number of people who bought both A and B (see eqn. (2)), the higher the value in expression (1), or the higher the degree of similarity between A and B, and vice versa.

Expression (1) may provide unexpected results in some situations. In some embodiments, expression (1) might therefore be modified to achieve better results, by adding the following:

$$P(B|A)-P(B)*\text{AdjustmentFactor}(A) \quad (4)$$

where the AdjustmentFactor(A) attempts to adjust the estimated value P(B) to improve the similarity score. The adjustment factor may be a multiplier that can be used to obtain similarity scores that are more in-line with expectations about similarities. Using the adjustment factor, however, provides less insight into the similarities between items and may also be less than completely accurate.

Second Model

The second model is a modification of the first model. The degree to which A is associated with, or is similar with, B could be represented as follows:

$$P(B|A)_{observed}-P(B|A)_{estimated} \quad (5)$$

where $P(B|A)_{observed}$ represents the same actual observed probability described above with respect to expressions (1) and (2), and $P(B|A)_{estimated}$ represents (in one embodiment) the estimated probability of users purchasing B given that they also purchased A under the assumption that the purchase events corresponding to A and B are independent. Essentially, $P(B|A)_{estimated}$ can represent an estimated random overlap between customers who bought A and customers who bought B divided by the number of customers who bought A. $P(B|A)_{estimated}$ can be determined by assuming that each user who bought A would have the same random chance of buying B as every other user.

Similar to above, the value determined by expression (5) may be used as a score to represent the degree of similarity or association between items A and B. This score might also be further manipulated to obtain a final similarity or association score by, for example, combining values calculated according to expression (5) for purchases, views, and other selection events.

Expression (5) reflects the concept that as the number of people who are estimated to buy A and B due to random chance increases, the less likely it is that A and B should be associated. As a result, when $P(B|A)_{estimated}$ increases, the value in expression (5) decreases. On the other hand, the more people who were actually observed to have bought both A and B, the higher the value of P(A similar to B) in equation (1), and the higher the degree of similarity between A and B (and vice versa).

This second model also may provide unexpected results in some circumstances. Thus, expression (5) might also be modified to achieve better results, by multiplying $P(B|A)_{estimated}$ by the AdjustmentFactor(A) of equation (4). As above, the adjustment factor may be a multiplier that can be used to obtain similarity scores that are more in-line with expectations about similarities.

Third Model

The assumption underlying expression (5) that each user who bought A would have the same random chance of buying B can result in unexpected associations. A more accurate assumption is that a user X's random chance of buying B is related to the number of purchases user X has made. For example, user X's random chance of buying B can be proportional to the number of purchases user X has made. As an example, suppose that out of 10 users, 9 bought one item. The remaining user bought 11 items. Thus, a total of 20 items were sold, resulting in an average purchase of 2 items per user. However, one user's actual purchases (11) are much higher than the average number of purchases (2). Thus, to improve associations, in certain embodiments the third model takes into account the number of purchases each user made who also bought item A.

In one embodiment, the third model also uses expression (5), reproduced here as expression (6):

$$P(B|A)_{observed} - P(B|A)_{estimated} \qquad (6)$$

However, in the third model, $P(B|A)_{estimated}$ (the estimated random overlap between users who would have purchased both A and B) may be determined differently than in the second model. To estimate the probability of users purchasing both A and B due to random chance ($P(B|A)_{estimated}$), the model can: 1) determine for each user who bought A, which number of other purchases were made by that user, and 2) determine the probability that one of those other purchases was B.

The probability that any given purchase of a user was B may be represented in equation (7) below. The probability that a user's other purchase (e.g., other than A) was B is given in equations (9) and (10) below. Equation (7) states:

$$P_{unit}(B) = \frac{\text{\# units of } B \text{ purchased by all users}}{\text{total \# of units in the catalog purchased}}. \qquad (7)$$

where $P_{unit}(B)$ may be termed a "unit probability." Thus, in one embodiment, the unit probability that any given purchase of a user was B represents the total purchases of B divided by the total number of purchases by all users.

$P(B|A)_{estimated}$ can now be derived by considering an example. In this example, user1 purchased 2 items, including A; and user 2 purchased 3 items, including A. The probability that user1 and user2 each also bought B can be represented as:

$$P(\text{user bought } B) = 1 - P(\text{none of user's non-}A \text{ purchases was } B) \qquad (8)$$

To illustrate, if in a computer system (e.g., an electronic catalog), 1 million units of B were sold, and 700 million units total were sold, the unit probability of B according to equation (7) would be 1/700. Consider user1, who purchased 2 items, one of which was A. The probability that user 1's single other purchase was B is simply 1/700 (see eqn. (7)).

User2, on the other hand, bought 2 items that were not A. The probability that user2's second purchase was not B is 1−1/700, or 699/700. This is because the probability that none of user2's non-A purchases was B is equivalent to $(1-P_{unit}(B))$. The probability that user2's third purchase was not B, is also 699/700. The probability that both of user2's other purchases were not B can be the product of these two probabilities, or $(699/700)^2$.

Said another way, the probability that a given user bought B (estimated), given that they bought A, can be represented as:

$$P(\text{user bought } B) = 1 - (P(\text{none of a user's non-}A \text{ purchases was } B)) \qquad (9)$$

Because P(none of a user's non-A purchases was B) is equivalent to $(1-P_{unit}(B))^{|c|}$, where |c| represents the number of items purchased by the user other than A, equation (9) can be restated as follows:

$$P(\text{user bought } B) = 1 - (1 - P_{unit}(B))^{|c|} \qquad (10)$$

In certain embodiments, equation (10) can be considered for multiple (e.g., all) users by taking the expected value of P(user bought B). Taking the expected value of equation (10) can include summing the right hand side of equation (10) over the number of people who bought A. As a result, we can arrive at an expression for $P(B|A)_{estimated}$ of equation (6):

$$P(B|A)_{estimated} = \frac{\sum_{C \in A} [1 - (1 - P_{unit}(B))^{|c|}]}{|A|} \qquad (11)$$

where summing over C∈A represents summing over all users C who bought A, and where |A| represents a number of people who bought A (as in equation (2)). Equation (11) may be simplified further, for example, to reduce computation time. In one embodiment, an approximation to (11) is:

$$P(B|A)_{estimated} = \frac{P_{unit}(B) \cdot \sum_{C \in A} |c|}{|A|} \qquad (12)$$

As a result of equation (12), the unit probability may be computed once instead of multiple times, and this can be multiplied by the summation and division over the number of people who bought A. Another example approximation of equation (11) is described below.

Thus, substituting from equations (2) and (12) in equation (6), the degree to which A is similar to item B in this third model may be represented as:

$$\frac{|A \cap B|}{|A|} - \frac{P_{unit}(B) \cdot \sum_{C \in A} |c|}{|A|} \qquad (13)$$

The similarity or association score for each item may be created based at least in part on equations (11) or (13), by the probabilistic analysis component 122. In addition, equations (11) or (13) may be used to compare quality of similar item pairs that were generated using the first or second models described above.

In certain embodiments, although calculations using the equations above can indicate similarity between items, thresholds may also be used to determine if the similarity should exist. For instance, a threshold of 2, 3, or more users having bought both A and B may be used to determine whether A and B should be associated. This may be helpful because arbitrary pairings of rare items by a single user may occur regularly, without indicating any degree of similarity between those items.

Closer Approximations of Equation (11)

For an item B, we can define |B|=number of users who have bought B and $P_B$=unit probability of B (e.g., $P_{unit}(B)$ according to equation (7)). We want to estimate |A∩B| (also referred to below as |AB|), the number of users who have purchased both items A and B. For a given user C∈A, define |c|=the number of distinct items user C has purchased not including their purchase of A. From equation (10), for a given user C∈A, we can estimate C's probability of buying B as $P(c \in B) = 1-(1-P_B)^{|C|}$.

Then, the expected value for $|A \cap B|$ is $$E(|AB|) = \sum_{C \in A} [1 - (1 - P_B)^{|c|}] \quad (14)$$

$$= \sum_{C \in A} \left[1 - \left[1 - \binom{|c|}{1} P_B + \binom{|c|}{2} P_B^2 - \ldots\right]\right] \quad (15)$$

$$= \sum_{C \in A} \left[\binom{|c|}{1} P_B - \binom{|c|}{2} P_B^2 + \ldots\right] \quad (16)$$

$$= \sum_{C \in A} \left[|c| P_B - \frac{|c|(|c|-1)}{2} P_B^2 + \ldots\right] \quad (17)$$

$$= COCA(A) P_B - COCA_2(A) P_B^2 + \ldots \quad (18)$$

where COCA, the count of user actions, is $$COCA(A) = \sum_{C \in A} |c| \quad (19)$$

and $$COCA_2(A) = \sum_{C \in A} \frac{|c|(|c|-1)}{2} \quad (20)$$

In general, $$COCA_n(A) = \sum_{C \in A} \binom{|c|}{n} \quad (21)$$

With the definition in equation (21), we can write $$E(|AB|) = \sum_{n=1}^{\infty} (-1)^{(n+1)} COCA_n(A) P_B^n \quad (22)$$

Thus, we can approximate $E(|AB|)$ in equation (14) by only using the first N terms, as represented in equation (22). In addition, $COCA_n(A)$ and $P_B$ can be computed for all items in a single pass. This computation may then allow $E(|AB|)$ to be approximated for any two items via a simple combination of pre-computed values. This computation may provide a large scaling advantage. Note that the approximation found in the numerator of expression (12) above can correspond to the n=1 approximation in expression (22).

Figure 2:
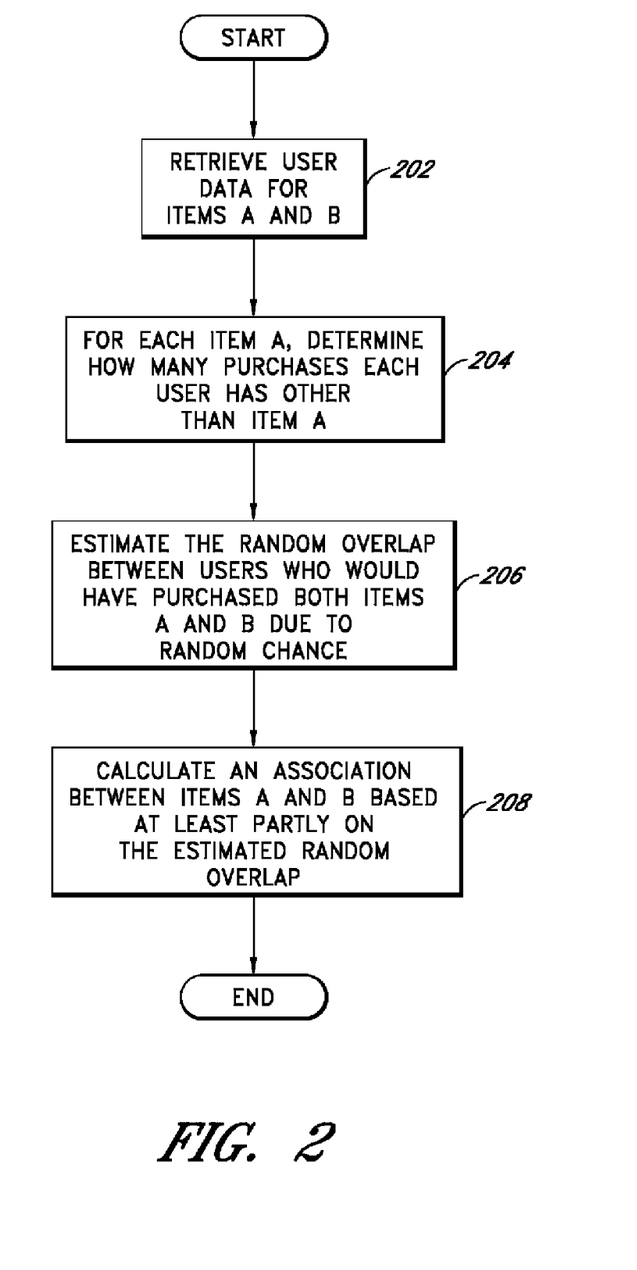
FIG. 2 illustrates an embodiment of a process for detecting associations between items.

FIG. 2 illustrates an embodiment of a process 200 for detecting probabilistic associations between items. The process 200 is implemented in one embodiment by the association mining system 100. In particular, the process 200 may be implemented by the probabilistic analysis component 122. Advantageously, in certain embodiments the process 200 facilitates detecting associations based at least partly on a number of items purchased by one or more users.

The process 200 begins at block 202 by retrieving user data for two items, item A and item B. The user data may include purchase, viewing, download, click, or other histories of one or more users. At block 204, for each item A, it is determined how many purchases each user has other than item A. This number can correspond to the value "c" described above with respect to FIG. 1.

At block 206, a random overlap can be estimated between users who would have (or might have) purchased both items A and B due to random chance. This value can correspond to expected value for $|A \cap B|$, described above. At block 208, an association can be calculated between items A and B based at least partly on the estimated random overlap. For example, equations (11) or (13) described above may be used to calculate probability scores, which may be considered association or similarity scores or may be used as a basis to determine association or similarity scores.

Figure 3:
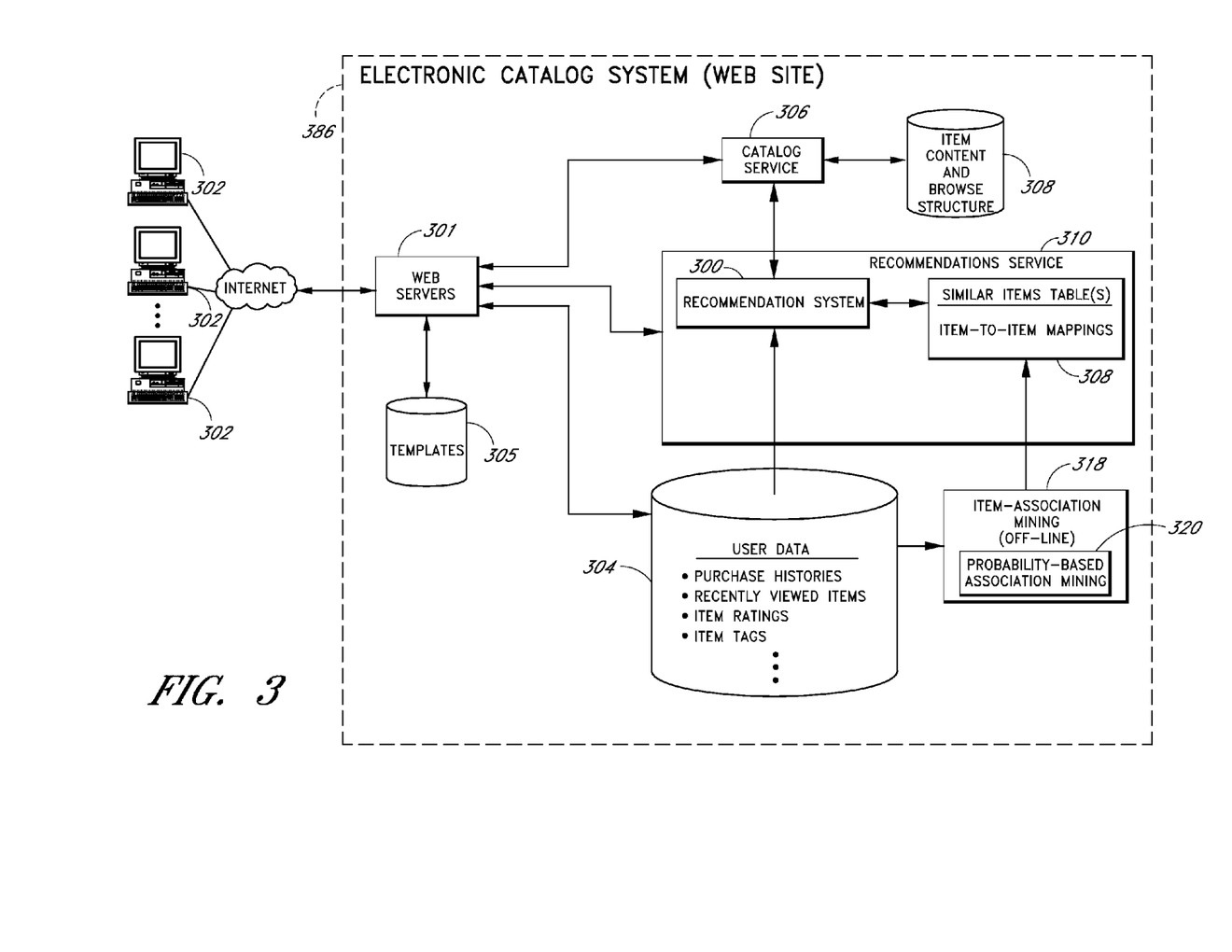
FIG. 3 illustrates one example of how the various association mining and recommendation features may be implemented in the context of a web-based electronic catalog system.

FIG. 3 illustrates how the various features described above may be implemented in the context of a web-based system that provides functionality for users to browse a computer system such as a catalog of items and to select particular items for purchase and/or rental. As will be recognized, the various features of the disclosed embodiments can also be implemented in other types of systems, including, e.g., music download systems that recommend music titles based on users' music libraries and/or download histories, video rental sites that recommend video/DVD titles based on users video rental histories, news sites that recommend news articles based on users' news browsing histories, systems for recommending television programs based on monitored television watching behavior of users, browser toolbar based systems that recommend web sites and other network resources based on users' web browsing histories across multiple sites, web services for providing recommendations, and Internet advertising systems. However, the various features described above are not limited to recommendations systems and can be applied for other uses, such as item clustering.

The system shown in FIG. 3 includes one or more web server machines 301 that generate and serve pages of a host web site in response to page requests from user computing devices 302. The web servers 301 provide user access to a catalog of items represented in a database 308 or collection of databases. The items preferably include items that may be purchased and/or rented via the web site (e.g., book, music and video titles in physical or downloadable form; consumer electronics products; household appliances; magazine and other subscriptions, etc.). The database 308 may also store data regarding how the items are arranged within a hierarchical browse structure. Data regarding the catalog items and the browse structure is accessible via a catalog service 306, which may be implemented as a web service.

The system also includes a data repository 304 (e.g., one or more databases) that stores various types of user data, including identifiers of the items in each user's collection. For example, the data repository 304 may store users' purchase histories, movie rental histories, item viewing histories, item ratings, and item tags. The purchase, rental and viewing histories may be stored as lists of item identifiers together with associated event timestamps. The various types of user data may be accessible to other components of the system via a data service (not shown), which may be implemented as a web service.

The system also includes a recommendation service 310 that generates recommendations in real time (or near-real time) in response to requests from users. The recommendations service 310 may use one or more "similar items" tables/datasets 308 to look up items that are similar or related to the items, together with associated data values indicating the strengths of such relationships. The similar items table(s) 308 may be generated off-line by an item association mining component 318 that analyzes users' purchase histories, item viewing histories, or some other type of user activity data, and detects and quantifies behavior-based associations between specific items. For instance, if purchase histories are used, item A may be mapped to item B in a purchase-based similar items table 308 if a relatively large number of the users who purchased item A also purchased item B. This mapping may include an indication of a degree of association or similarity, such as an association score. The score may be generated based at least partly using certain of the equations and/or techniques described above or the like. The score may be stored together with descriptions of the associated items in a table or other data structure.

This mapping may be created at least in part using a probability-based association mining module 320. The probability-based association mining module 320 may use any of the probability models described above, including the third model of FIG. 1, to generate these mappings. The probability-based association mining module 320 can analyze and create mappings once, once per day or other time period, each time a batch of item data is added to the repository 324, or at varying frequency based on how often item data is provided from vendors.

Other types of recommendation engines, including recommendation engines that do not use item-to-item mappings or engines that use different types of item-to-item mappings, may also be used by the recommendations service 310.

The electronic catalog system may also include services for handling various other types of tasks, such as user authentication, transaction processing, search query processing, storing user-assigned tags and ratings, processing of user-submitted sales listings, etc.

The web servers 301 use a data repository of web page templates 305 to dynamically generate web pages in response to browser requests. The templates directly or indirectly specify the service calls that are made to the services to, e.g., request data needed to generate the requested page.

When a user clicks on a link for viewing recommendations, a web server 301 requests recommendations for the user from the recommendations service 310. The recommendations service 310 then uses all or a portion of the user's activity data or collection (typically depending upon the context of the user's request) to generate the recommendations. As part of this process, the recommendations service 310 may use association scores (e.g., derived from the equations above) to generate recommendations.

The services and other application components 300, 306, 310, 318, and 320 shown in FIG. 3 may be implemented in software code modules executed by any number of general purpose computers or processors, with different services optionally but not necessarily implemented on different machines interconnected by a network. The code modules may be stored in any type or types of computer storage, such as hard disk drives and solid state memory devices. The various data repositories 304, 305, 308, 324 may similarly be implemented using any type of computer storage, and may be implemented using databases, flat files, or any other type of computer storage architecture.

CONCLUSION

Each of the processes and algorithms described above may be embodied in, and fully automated by, code modules executed by one or more machines that include one or more computers or computer processors. The machines may be geographically co-located or geographically distributed, for example, across a network. The code modules may also be stored on any type of computer-readable medium or computer storage device. The processes and algorithms may also be implemented partially or wholly in application-specific circuitry. The results of the disclosed processes and process blocks may be stored, persistently or otherwise, in any type of computer storage.

The various features and processes described above may be used independently of one another, or may be combined in various ways. All possible combinations and sub-combinations are intended to fall within the scope of this disclosure. In addition, certain methods or process steps may be omitted in some implementations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. A system for using probabilistically-generated item associations to provide personalized item recommendations, the system comprising:
   a computer system comprising one or more processors, the computer system comprising:
      a probabilistic analysis component executed by the one or more processors, the probabilistic analysis component configured to:
         access item data from a data repository, the item data comprising information regarding a plurality of items, the data repository comprising physical computer storage;
         access user data comprising information about item selections by a plurality of users;
         programmatically generate an association between a first item and a second item of the item data based at least in part on the user data by at least:
            determining, from the user data, a first probability that first users selected both the first and second items,
            estimating, from the user data, a second probability that second users who selected the first item would have selected the second item independent of selecting the first item, said estimating comprising 1) determining a number of item selections other than the selection of the first item made by each of the second users and 2) using the number of item selections to estimate a probability that one of the other item selections was the second item, and
            deriving an association score for the first and second items based at least in part on a difference between the first probability and the second probability, the association score reflecting a value of the association between the first and second items; and a recommendation module executed by the one or more processors, the recommendation module configured to use the association to generate one or more item recommendations for a target user.

2. The system of claim 1, wherein the items comprise items in an electronic catalog.

3. The system of claim 2, wherein the item selections comprise one or more of purchases, views, downloads, rentals, and clicks.

4. The system of claim 1, wherein the probabilistic analysis component is further configured to programmatically generate the association by transforming at least part of the item data into the association.

5. The system of claim 1, wherein the computer system comprises multiple physical computers.

6. A computer-implemented method of creating associations between physical items represented in a data repository, the method comprising:

by a computer system comprising computer hardware:

accessing item data from a data repository, the item data comprising information representing a plurality of physical items, the data repository comprising physical computer storage;

accessing user data comprising information about item selections by a plurality of users; and programmatically generating an association between a first item and a second item of the item data based at least in part on the user data, said generating comprising:

determining, from the user data, a first probability that first users selected both the first and second items, estimating, from the user data, a second probability that second users who selected the first item would have selected the second item independent of selecting the first item by at least 1) determining a number of item selections other than the selection of the first item made by each of the second users and 2) using the number of item selections to estimate a probability that one of the other item selections was the second item, and deriving an association score for the first and second items based at least in part on the first and second probabilities, the association score reflecting a value of the association between the first and second items.

7. The method of claim 6, wherein the items comprise items in an electronic catalog.

8. The method of claim 7, wherein the item selections comprise one or more of purchases, views, downloads, rentals, and clicks.

9. The method of claim 6, further comprising using the association between the first item and the second item to recommend one or more items to a user.

10. The method of claim 6, wherein said programmatically generating the association comprises transforming at least part of the item data into the association.

11. The method of claim 6, wherein said determining a number of item selections comprises calculating an average number of the item selections other than the selection of the first item made by each of the second users.

12. The method of claim 6, wherein the computer system comprises one or more processors.

13. The method of claim 6, wherein said deriving an association score for the first and second items based at least in part on the first and second probabilities comprises deriving an association score for the first and second items based at least in part on a difference between the first probability and the second probability.

14. A computer system for detecting associations between items represented in a data repository, the system comprising:

a probabilistic analysis component comprising computer hardware, the probabilistic analysis component configured to:

access user data comprising information about item selections by a plurality of users; and programmatically generate associations between first and second items based at least in part on the user data by at least:

determining, from the user data, a first probability that first users selected both the first and second items, estimating, from the user data, a second probability that second users who selected the first item would have selected the second item based at least partly on a number of item selections other than the selection of the first item made by each of the second users, deriving an association score for the first and second items based at least in part on the first and second probabilities, the association score reflecting a degree of the association between the first and second items, and store the association in a data repository.

15. The system of claim 14, wherein the items comprise items in an electronic catalog.

16. The system of claim 15, wherein the item selections comprise one or more of purchases, views, downloads, rentals, and clicks.

17. The system of claim 14, further comprising using the association between the first and second items to recommend one or more items to a user.

18. The system of claim 14, wherein the probabilistic analysis component is further configured to programmatically generate associations by transforming at least part of the item data into the association.

19. The system of claim 14, wherein the probabilistic analysis component is further configured to approximate the estimated second probability by calculating an average number of item selections.

20. The system of claim 14, wherein the computer system comprises multiple physical computers.

21. The system of claim 14, wherein the probabilistic analysis component is further configured to estimate the second probability by at least using the number of item selections to estimate a probability that one of the other item selections was the second item.

22. The system of claim 14, wherein said deriving an association score for the first and second items based at least in part on the first and second probabilities comprises deriving an association score for the first and second items based at least in part on a difference between the first probability and the second probability.

* * * * *